United States Patent

Holm

[15] 3,673,124

[45] June 27, 1972

[54] SOLUBLE OIL COMPOSITION

[72] Inventor: Le Roy W. Holm, Fullerton, Calif.

[73] Assignee: Union Oil Company of California, Los Angeles, Calif.

[22] Filed: Aug. 27, 1969

[21] Appl. No.: 853,522

Related U.S. Application Data

[63] Continuation-in-part of Ser. No. 713,303, March 15, 1968, Pat. No. 3,482,632.

[52] U.S. Cl. .......................252/8.55 D, 166/273, 166/274, 166/275, 252/495
[51] Int. Cl. ...........................................C09k 3/00
[58] Field of Search ..................252/8.55 D, 49.5; 166/273, 166/274, 275

[56] References Cited

UNITED STATES PATENTS

| | | | |
|---|---|---|---|
| 3,013,973 | 12/1961 | Bennett | 252/49.5 X |
| 3,163,214 | 12/1964 | Csaszar | 252/8.55 X |
| 3,254,714 | 6/1966 | Gogarty et al. | 166/274 |
| 3,296,129 | 1/1967 | Scheidker et al. | 252/49.5 X |
| 3,330,343 | 7/1967 | Tosch et al. | 252/8.55 X |
| 3,454,095 | 7/1969 | Messenger et al. | 166/274 X |
| 3,477,511 | 11/1969 | Jones et al. | 166/274 |
| 3,507,331 | 4/1970 | Jones | 166/273 |

*Primary Examiner*—Herbert B. Guynn
*Assistant Examiner*—Harris A. Pitlick
*Attorney*—Milton W. Lee, Richard C. Hartman, Lannas S. Henderson, Robert E. Strauss and Dean Sandford

[57] ABSTRACT

A soluble oil composition comprising a mixture of liquid hydrocarbon, a surface active agent and butyl Cellosolve that is particularly adapted for use as a displacement fluid in a miscible flooding process. The soluble oil composition can be employed as a substantially anhydrous liquid or as a water-in-oil microemulsion.

10 Claims, No Drawings

SOLUBLE OIL COMPOSITION

This application is a continuation-in-part of application Ser. No. 713,303, filed Mar. 15, 1968, and now issued as U.S. Pat. No. 3,482,632.

This invention relates to the recovery of oil from subterranean petroleum reservoirs, and more particularly to an improved displacement fluid for use in a miscible flooding process for the recovery of petroleum.

It has long been recognized that substantial amounts of oil remain unrecovered at the completion of normal primary recovery operations. Hence, various secondary methods of recovering additional quantities of oil have been proposed, such as the well-known technique of water flooding in which water is injected into the reservoir through an injection well to drive additional oil toward one or more production wells spaced apart in the reservoir from the injection well. Although an additional quantity of oil can often be recovered by water flooding, the efficiency of the water flood and the ultimate oil recovery can be further improved by introducing a solvent that is miscible with both the connate oil and with the flood water into the reservoir ahead of the flood water.

One particular solvent system that has been suggested for use with a water drive comprises a mixture of substantially anhydrous soluble oil and an inert, nonaqueous solvent, preferably admixed in such proportions that the viscosity of the mixture approximates the viscosity of the formation oil. The soluble oil consists of a hydrocarbon phase; one or more soaps or non-soap surface active materials; and a stabilizing agent which is usually a monohydric or polyhydric alcohol, or other partially oxygenated, low molecular weight hydrocarbon, such as a ketone. The soluble oil often contains some free organic acid, and especially a fatty acid, such as oleic acid.

It has also been proposed that the flood water be preceded by a microemulsion consisting of a soluble oil containing substantial quantities of water, such as from about 10 to 50 percent or more water. These microemulsions are relatively stable, transparent emulsions of the water-in-oil type, i.e., oil is the continuous phase and small droplets of water are dispersed therein.

While the foregoing anhydrous soluble oils and microemulsions are effective in recovering more oil than recovered by conventional water flooding, it is nevertheless desirable to even further improve the miscible flooding process to reduce its cost and to recover additional amounts of oil.

Accordingly, a principal object of this invention is to provide an improved miscible displacement fluid for the recovery of petroleum from subterranean reservoirs. Another object of the invention is to provide an improved miscible displacement fluid suitable for injection into an oil-containing reservoir and subsequent displacement through the reservoir by flood water. A further object of the invention is to provide an improved soluble oil composition useful as a miscible displacement fluid in an oil recovery process. A still further object of the invention is to provide an improved water-in-oil microemulsion for use as a miscible displacement fluid. Other objects and advantages of the invention will be apparent from the following description.

Briefly, this invention contemplates an improved soluble oil composition comprising a mixture of liquid hydrocarbon, a surface active agent and butyl Cellosolve useful as a displacement fluid in a miscible flooding process. This composition is injected into the reservoir through an injection well, and thereafter an aqueous flooding agent is injected to drive the miscible displacement fluid towards a production well spaced apart in the reservoir from the injection well. The soluble oil can be injected into the reservoir as an anhydrous liquid, or it can be injected as a water-in-oil microemulsion.

More specifically, this invention involves a miscible flooding process in which oil is displaced from a subterranean oil-bear-ing reservoir by an improved soluble oil composition containing a minor proportion of butyl Cellosolve. In the practice of the invention, a slug of the improved soluble oil composition in the form of a substantially anhydrous liquid or a water-in-oil microemulsion is injected into the reservoir through one or more injection or input wells penetrating the oil-bearing formation and forced through the reservoir by subsequently injected flood water toward at least one production or output well similarly completed in the reservoir. As the miscible flooding medium passes through the reservoir, it displaces residual oil therein and moves it into the producing well whereupon the oil can be recovered by conventional means. The injection and production wells can be arranged in any convenient pattern designed to achieve maximum contact of the oil-bearing zones by the advancing flood front, such as the conventional "five-spot" pattern wherein a central producing well is surrounded by four somewhat symmetrically located injection wells. Another of the conventional flooding patterns that can be employed in the practice of this invention is the "line drive" pattern in which the injection wells are arranged in a line so that the injected flooding medium advances through the formation to displace oil toward one or more spaced production wells that can also be arranged in a line substantially parallel to the line of injection wells.

The soluble oils used herein are oleaginous compositions which have the ability to spontaneously emulsify with water when admixed therewith. These soluble oils comprise a liquid hydrocarbon, one or more selected surface active agents, and a minor proportion of butyl Cellosolve. The emulsions formed by the addition of water to a soluble oil are of the water-in-oil type in that at water concentrations less than the inversion concentration, oil is the continuous phase and the water is dispersed in the oil in the form of very fine droplets, or micelles, which are less than about 0.1 micron in size, and usually range in size from about 100 to 600 A. These emulsions are generally transparent in appearance, and are stable in that they remain as microemulsions on aging. By transparent, it is meant that the microemulsions do not have a cloudy or opaque appearance, even though they may contain color bodies. It is recognized, of course, that some cloudiness may appear at certain water concentrations without adversely affecting the utility of the microemulsions as a miscible displacement agent. Emulsions of this type are designated microemulsions to distinguish them from ordinary water-in-oil macroemulsions in which the lower limit of particle size of the water droplets is about 0.1 micron. At water concentrations above the inversion concentration, the emulsion inverts to an emulsion of the water-in-oil type in which droplets of oil are dispersed in a continuous water phase. It is preferred that the water concentrations of the microemulsion of this invention be maintained below the inversion concentration so as to prevent inversion to emulsions of the oil-in-water type.

One of the major constituents of the improved soluble oil composition of this invention is a liquid hydrocarbon, which can comprise a crude petroleum oil, such as a crude oil previously recovered from the reservoir, or other conveniently available crude oil; a refined or semi-refined petroleum product, such as gasoline, naptha, stove oil and diesel; a residual product obtained by the distillation of lower boiling fraction from a crude oil, such as bunker fuel oil and other residual products; a low value refinery by-product, such as catalytic cycle oil, lube oil extract, and the like; and liquefied normally gaseous hydrocarbons such as propane, butane and LPG.

While soluble oils can be prepared from any of these hydrocarbon materials, or mixtures of hydrocarbons, it has been found that oil recoveries are especially increased by miscible flooding with a soluble oil or microemulsion compounded with crude petroleum oil, or other hydrocarbon mixture containing relatively high-boiling hydrocarbon constituents, and butyl Cellosolve. By relatively high-boiling hydrocarbons is meant those boiling at least above about 400° F., and more preferably above about 600° F. The hydrocarbon base stock can contain low-boiling hydrocarbons boiling below about 400° F. without adversely affecting oil recovery, so long as a substantial portion of the base stock is comprised of the high-boiling components. For example, excellent displacement efficiencies are obtained with soluble oils compounded from crude petroleum, even though the crude petroleum contains some fractions boiling as low as 100° F. Thus, the miscible displacement fluids preferred for use in the practice of this invention comprise mixtures of crude petroleum or other hydrocarbon mixtures containing relatively high-boiling hydrocarbon constituents, a surface active agent, and butyl Cellosolve.

Surface active materials which can be used are those that when admixed with the hydrocarbon cause the formation of microemulsions of the water-in-oil type on the subsequent addition of water. Agents which exhibit this property can be defined by their hydrophilic-lipophilic balance and by their spreading coefficients. The hydrophilic-lipophilic balance is an indication of the size and strength of the hydrophilic, or water-loving, or polar groups, and the lipophilic, or oil-loving, or non-polar, groups in a surfactant material expressed by a numerical value designated HLB number. The spreading coefficient is an indication of the facility with which one liquid spreads upon another liquid. Spreading coefficients greater than 0 indicate that the first liquid will spread on the second, and coefficients less than 0 indicate that the supernatant liquid will simply form floating lenslike drops. Accordingly, surface active material, or mixtures of materials possessing the ability to spontaneously emulsify water in oil exhibit average HLB numbers of about 3 to 7, and the most negative spreading coefficient consistent with the system.

A number of surface active materials that exhibit the ability to spontaneously emulsify oil and water to produce water-in-oil microemulsions are commercially available. Among the preferred agents are various preferentially oil-soluble anionic surfactants such as the higher alkyl aryl sulfonates, particularly the alkyl naphthenic monosulfonates. A particularly preferred surface active agent is an alkyl aryl monosulfonate prepared by sulfonation of an aromatic petroleum fraction. These sulfonates are preferably in the form of their sodium salts, however, other salts can be used.

Butyl Cellosolve is a colorless liquid solvent, miscible both with water and with oil, and is chemically designated ethylene glycol monobutyl ether or 2-butoxyethanol. The term "Cellosolve" is a trademark of the Union Carbide Corporation. When included in a minor proportion in the soluble oil compositions of this invention, butyl Cellosolve functions as a stabilizing agent rendering the surface active component of the soluble oil more effective and improving the stability of the resulting microemulsion. Further, it has been discovered that miscible flooding with soluble oils and microemulsions containing a minor proportion of butyl Cellosolve results in the recovery of increased quantities of oil. While the exact mechanism by which the increased recovery is effected is not understood, it has nevertheless been demonstrated that miscible flooding with soluble oils and microemulsions containing butyl Cellosolve is more efficient than flooding with similar soluble oils and microemulsions containing other stabilizing agents, such as isopropyl alcohol, particularly where the soluble oil or microemulsion is compounded with a hydrocarbon containing relatively high-boiling constituents.

The compositions of this invention comprise a mixture of about 45 to 90 percent liquid hydrocarbon, such as crude petroleum oil or other hydrocarbon containing a substantial proportion of constituents boiling above about 400° F.; 4 to 30 percent of a surface active agent, such as an alkyl aryl monosulfonate; and 0.5 to 8 volume percent butyl Cellosolve. This composition can also contain water in an amount up to that amount causing inversion to an oil-in-water emulsion. A preferred composition in accordance with this invention useful as a miscible displacement fluid com-prises a mixture of about 45 to 75 percent liquid hydrocarbon, such as crude petroleum or other high boiling hydrocarbon; 8 to 30 percent of a surface active material, such as an alkyl aryl monosulfonate obtained by sulfonation of an aromatic petroleum fraction; 3 to 8 percent butyl Cellosolve; and 0 to 40 percent water. Also, where the hydrocarbon liquid has a relatively high viscosity, light liquid hydrocarbon can be added to increase the mobility of the resulting soluble oil to obtain a more favorable mobility ratio between the soluble oil and the following drive fluid. The light hydrocarbon will usually not constitute more than 25 volume percent of the resulting soluble oil.

The compositions useful in the practice of this invention can be prepared by any of the conventional techniques. One suitable method of preparing these compositions is to first admix the hydrocarbon base stock, surface active material and butyl Cellosolve in the desired proportions to form a substantially anhydrous soluble oil. Thereafter, if desired, water is added to obtain a microemulsion of the desired water content. Preferably, the water employed in forming the microemulsion is a salt-containing fresh water having a dissolved salt content of less than about 15,000 ppm, and more preferably less than about 5,000 ppm. Monovalent salts can be added to obtain a water having the preferred salt content.

The quantity of soluble oil or microemulsion injected should be sufficient to establish in the reservoir a miscible bank which can be displaced through the reservoir by the subsequently injected aqueous flooding medium. Satisfactory recoveries can usually be obtained by the injection of 0.01 to 0.15 reservoir pore volume of the soluble oil or microemulsion.

In one preferred embodiment of this invention, a hydrocarbon, such as previously recovered reservoir oil; a mixed alkyl aryl monosulfonate obtained by sulfonation of an aromatic petroleum fraction; and butyl Cellosolve are admixed to obtain a substantially anhydrous soluble oil comprised of about 45 to 90 percent liquid hydrocarbon, 4 to 30 percent surface active agent and 0.5 to 8 percent butyl Cellosolve, and preferably from about 45 to 75 percent hydrocarbon, 8 to 30 percent surface active agent and 3 to 8 percent butyl Cellosolve. This anhydrous soluble oil can be used as the miscible displacement agent or water can be added to the soluble oil to obtain a water-in-oil microemulsion containing water in an amount up to the amount causing inversion to an oil-in-water emulsion, and preferably up to about 40 percent water.

The soluble oil prepared in the foregoing manner is then injected into the reservoir through one or more injection wells in an amount equivalent to 0.01 to 0.15 reservoir pore volume of the reservoir to be treated. Aqueous flooding medium is then injected to displace the soluble oil toward at least one production well spaced apart in the reservoir, from which fluids are produced in conventional manner. The aqueous flooding medium can comprise water or brine, and can be made more viscous by the addition of a thickening agent, such as sugar, dextran, carboxymethyl cellulose, amines, glycerine, guar gum and mixtures of these agents. Also, the aqueous flooding medium can be rendered more viscous by the addition of a small amount of a water-soluble polymer, such as a polyacrylamide, and particularly a partially hydrolyzed polyacrylamide.

In a preferred method of practicing this invention, thickening agent is added to only an initial portion of the flood water. Thus, in this preferred embodiment, 0.01 to 0.15 reservoir pore volume of soluble oil is injected into the reservoir and followed by 0.1 to 0.5 reservoir pore volume of thickened aqueous flooding medium. Thereafter water or brine is injected to drive the previously injected fluids toward at least one spaced production well.

The invention is further described by the following examples which are illustrative of specific modes of practicing the invention and are not intended as limiting the scope of the invention as defined by the appended claims.

EXAMPLE 1

The increased oil recovery obtainable by miscible flooding with a soluble oil having a composition in accordance with this invention is demonstrated by the following laboratory tests. Two substantially identical test cores 2 feet long by 1 ½ inches in diameter are prepared by packing Lucite tubes with Nevada 130 sand. The cores are first saturated with water and then with an Illinois crude oil having a gravity of 39° API. Final oil saturation is about 80 percent.

A miscible displacement fluid is prepared by admixing 72 percent of the Illinois crude, 6.7 percent isopropyl alcohol, and 21.3 percent of a mixed alkyl aryl petroleum monosulfonate marketed by the Sonneborne Division of Witco Chemical Company, Inc. under the trademark Petronate CR. Petronate CR is an oil solution containing about 62 percent of alkyl aryl sodium sulfonates having a molecular weight in the range of 490 to 510 and about 5 percent water. The first test is conducted by flooding one of the cores with 0.10 pore volume of the anhydrous soluble oil. The soluble oil is driven through the core with an aqueous flooding medium thickened by the addition of 0.06 weight percent of a partially hydrolyzed polyacrylamide marketed by the Dow Chemical Company under the trademark Pusher 500. The recovered oil is accumulated and the volume of oil recovered is measured. The ultimate oil recovery after the injection of 1.3 pore volumes of aqueous flooding medium is 87 percent of the original oil-in-place exclusive of the amount of soluble oil injected.

The foregoing test is repeated on the second core using 0.10 pore volume of a soluble oil in accordance with this invention prepared by admixing 72 percent Illinois crude, 21.3 percent Petronate CR and 6.7 percent butyl Cellosolve. The ultimate oil recovery after the injection of 1.3 pore volumes of aqueous flooding medium is 91.8 percent of the original oil-in-place exclusive of the amount of soluble oil injected.

EXAMPLE 2

A number of substantially identical test cores 6 feet long by 1 ½ inches in diameter are prepared by packing Lucite tubes with Nevada 130 sand. The cores are first saturated with water and then with an Illinois crude oil having a gravity of 39° API.

Several microemulsions are prepared by admixing Illinois crude oil or gasoline, butyl Cellosolve or isopropyl alcohol, and alkyl aryl petroleum sulfonates marketed by the Sonneborn Division of Witco Chemical Company, Inc. under the trademarks Petronate HL and Petronate CR to form an anhydrous soluble oil. Petronate CR is described in Example 1 and Petronate HL is an oil solution containing about 52 percent of alkyl aryl sodium sulfonates having a molecular weight in the range of 440 to 470 and about 3.5 percent water. The microemulsion is then produced by adding a desired quantity of tap water containing about 700 ppm dissolved salts to the soluble oil.

The cores are flooded with brine until they become watered-out to simulate a conventional water flood. Residual oil saturations are 24–30 percent. Then 0.025 pore volume of a microemulsion is injected into and driven through the core with 0.40 pore volume of an aqueous 0.2 weight percent solution of partially hydrolyzed polyacrylamide marketed by the Dow Chemical Company under the trademark Pusher 500, and then with an aqueous brine solution. The recovered oil is accumulated and the volume of oil recovered is measured. The results of these tests are summarized in Table 1. It is apparent from these data that while butyl Cellosolve effects some improvement in oil recovery in a soluble oil system compounded with gasoline, an unexpectedly large increase in oil recovery is experienced in a soluble oil system compounded with petroleum crude oil.

EXAMPLE 3

A miscible flooding operation is conducted on an oil-containing reservoir in accordance with the method of this invention. Four injection wells are arranged in a rectangular pattern around a single centrally located production well. A miscible displacement fluid comprising a microemulsion is prepared by admixing 69.2 percent previously recovered petroleum crude oil, 6.4 percent butyl Cellosolve, 20.4 percent Petronate CR and 4.0 percent fresh water containing about 900 ppm dissolved salts. The microemulsion is injected into each of the injection wells at injection rates of 30–40 barrels per day until a total amount of microemulsion equivalent to about 0.05 pore volume is injected. Thereafter, aqueous flooding medium is injected into the reservoir through each of the injection wells and petroleum and other produced fluids are recovered from the central producing well.

EXAMPLE 4

A composition prepared by admixing the following ingredients:

|  | Vol. % |
|---|---|
| 37° API Texas crude oil | 48.3 |
| Alkyl aryl sulfonate | 10.6[1] |
| Butyl Cellosolve | 1.1 |
| Water | 40.0 |
| Total: | 100.0 |
| (1)Contains 49% active alkyl aryl sulfonate | |

This composition exhibits the following properties:

| | |
|---|---|
| Brookfield viscosity at 6 rpm with a U.L. adapter | 55.6 cp |
| Appearance of a thin film | clear |

EXAMPLE 5

A composition prepared by admixing the following ingredients:

|  | Vol. % |
|---|---|
| 37° API Texas crude oil | 77.1 |
| Alkyl aryl sulfonate | 17.1[1] |
| Butyl Cellosolve | 1.8 |
| Water | 4.0 |
| Total: | 100.0 |
| (1)Contains 50% active alkyl aryl sulfonate. | |

This composition exhibits the following properties:

| | |
|---|---|
| Brookfield viscosity at 6 rpm with a U.L. adapter | 24.2 cp |
| Appearance of a thin film | clear |

TABLE 1

| Run | Microemulsion composition, vol. percent | | | Water | Residual oil saturation after initial flood, percent | Ultimate oil recovery, percent |
|---|---|---|---|---|---|---|
| | Hydrocarbon | Stabilizing Agent | Surfactant | | | |
| 1 | 48.6 (gasoline) | 6.1 (isopropyl alcohol) | 12.9 (Petronate HL) | 32.4 | 24.6 | 71.6 |
| 2 | do | 6.1 (butyl Cellosolve) | do | 32.4 | 26.3 | 73.6 |
| 3 | 69.2 (crude oil) | 6.4 (isopropyl alcohol) | 20.4 (Petronate CR) | 4 | 28.2 | 59.6 |
| 4 | do | 6.4 (butyl Cellosolve) | do | 4 | 29.3 | 83.8 |

EXAMPLE 6

A composition prepared by admixing the following ingredients:

|  | Vol. % |
|---|---|
| 37° API Texas crude oil | 46.2 |
| Alkyl aryl sulfonate | 12.5[1] |
| Butyl Cellosolve | 1.3 |
| Water | 40.0 |
| Total: | 100.0 |

(1) Contains 46% active alkyl aryl sulfonate.

This composition exhibits the following properties:

| Brookfield viscosity at 6 rpm with a U.L. adapter | 95 cp |
|---|---|
| Appearance of a thin film | slightly cloudy |

EXAMPLE 7

A composition prepared by admixing the following ingredients:

|  | Vol. % |
|---|---|
| 39° API Illinois crude oil | 61.2 |
| Straight run motor gasoline stock | 8.0 |
| Alkyl aryl sulfonate | 20.4[1] |
| Butyl Cellosolve | 6.4 |
| Water | 4.0 |
| Total: | 100.0 |

(1) Contains 48.5% active alkyl aryl sulfonate.

This composition exhibits the following properties:

| Brookfield viscosity at 6 rpm with a U.L. adapter | 17.2 cp |
|---|---|
| Appearance of a thin film | clear |

EXAMPLE 8

A composition prepared by admixing the following ingredients:

|  | Vol. % |
|---|---|
| 37° API Texas crude oil | 35.8 |
| Alkyl aryl sulfonate | 7.8[1] |
| Butyl Cellosolve | 0.9 |
| Water | 55.5 |
| Total: | 100.0 |

(1) Contains 50% active alkyl aryl sulfonate.

This composition exhibits the following properties:

| Brookfield viscosity at 6 rpm with a U.L. adapter | 60.2 cp |
|---|---|
| Appearance of a thin film | clear |

EXAMPLE 9

A composition prepared by admixing the following ingredients:

|  | Vol. % |
|---|---|
| Gas oil (500–650° range) | 72.0 |
| Butyl Cellosolve | 6.7 |
| Alkyl aryl sulfonate | 21.3[1] |
| Total: | 100.0 |

(1) Contains 62% active alkyl aryl sulfonate.

This composition exhibits the following properties upon the addition of water:

| Vol. % Water Added | Viscosity,[1] cp | Appearance |
|---|---|---|
| 0 | 12.6 | clear |
| 10 | 36.0 | clear |
| 20 | 53.6 | clear |
| 32 | >1600 | slightly cloudy |
| 45 | 186 | clear |

(1) Brookfield viscosity at 6 rpm with a U.L. adapter.

EXAMPLE 10

A soluble oil is prepared by admixing 78.1 volume percent of 37° API Texas crude oil, 19.9 volume percent mixed alkyl aryl sulfonates containing 48.2 percent active sulfonates, and 2.0 volume percent butyl Cellosolve.

The soluble oil is mixed with incremental portions of water containing about 470 ppm dissolved salts, and the Brookfield viscosity and appearance of the resulting emulsions observed. These data are reported in Table 2.

The above test is repeated using the same water to which 0.25 weight percent sodium chloride has been added. The Brookfield viscosity and appearance of the resulting emulsions are also reported in Table 2.

TABLE 2

| Water added, vol. percent | Low salt content water | | Water containing added salt | |
|---|---|---|---|---|
|  | Viscosity, cp.[1] | Appearance | Viscosity, cp.[1] | Appearance |
| 0 | 23.8 | One phase clear | 23.8 | One phase clear. |
| 5.65 | 60.6 | do | 48.5 | Do. |
| 10.7 | 59.8 | do | 50.9 | Do. |
| 21.9 | 43.3 | do | 36.7 | Do. |
| 30.6 | 47.9 | do | 35.2 | Do. |
| 39.4 |  |  | 55.8 | Do. |
| 40.5 | 128 | Cloudy | 44.7 | Do. |
| 50 | 20.2 | Two phase, cloudy [2] | 35.2 | Do. |
| 60 | 6.2 | do [2] | 3.5 | Do. |

[1] Brookfield viscosity at 6 r.p.m. with a U.L. adapter.
[2] Inverted to oil-in-water emulsion.

Various embodiment and modifications of this invention have been described in the foregoing description and examples, and further modification will be apparent to those skilled in the art. Such modifications are included within the scope of this invention as defined by the following claims.

Having now described the invention, I claim:

1. An oil-external soluble oil composition comprising 45 to 90 volume percent petroleum crude oil, 4 to 30 volume percent oil-soluble surface active alkyl aryl sulfonates, and 0.5 to 8 volume percent ethylene glycol monobutyl ether.

2. The composition defined in claim 1 including water in an amount not greater than that amount of water causing inversion to an oil-in-water emulsion.

3. The composition defined in claim 2 including up to about 40 volume percent water.

4. The composition defined in claim 2 wherein said water is present in the form of a water-in-oil microemulsion.

5. The composition defined in claim 2 including a water-soluble alkali metal salt in an amount up to about 15,000 parts per million parts of water.

6. The composition defined in claim 1 wherein said petroleum crude oil contains a substantial proportion of constituents boiling above about 400° F.

7. The composition defined in claim 1 comprising 45 to 75 volume percent petroleum crude oil, 8 to 30 volume percent oil soluble surface active alkyl aryl sulfonates, and 3 to 8 volume percent ethylene glycol monobutyl ether.

8. A composition consisting essentially of 45 to 90 volume percent petroleum crude oil, 8 to 30 volume percent oil-soluble surface active mixed alkyl aryl monosulfonates, 0.5 to 8 volume percent ethylene glycol monobutyl ether, and water in an amount not greater than that amount of water causing inversion to an oil-in-water emulsion, said water being present in the form of a water-in-oil microemulsion.

9. The composition defined in claim 8 including a light liquid hydrocarbon to reduce the viscosity of the microemulsion.

10. The composition defined in claim 8 including a water-soluble monovalent alkali metal salt in an amount up to about 15,000 parts per million parts of water.

* * * * *